US008355852B2

(12) United States Patent
Grimm et al.

(10) Patent No.: US 8,355,852 B2
(45) Date of Patent: Jan. 15, 2013

(54) SLOW OR STOPPED VEHICLE AHEAD ADVISOR WITH DIGITAL MAP INTEGRATION

(75) Inventors: Donald K. Grimm, Utica, MI (US); Hariharan Krishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1242 days.

(21) Appl. No.: 11/744,407

(22) Filed: May 4, 2007

(65) Prior Publication Data

US 2008/0275618 A1 Nov. 6, 2008

(51) Int. Cl.
*G06F 17/00* (2006.01)
*G06F 17/10* (2006.01)
*B60T 7/12* (2006.01)
*B60T 8/32* (2006.01)
*G08G 1/00* (2006.01)
*G08G 1/09* (2006.01)
*G08G 1/123* (2006.01)

(52) U.S. Cl. .......... 701/96; 701/409; 701/422; 701/468; 701/516; 701/301; 340/901; 340/903; 340/905; 180/167

(58) Field of Classification Search ................ 701/1, 36, 701/70, 93, 300, 301, 91, 96, 45, 116, 117, 701/118, 119, 400, 408, 409, 414, 415, 422, 701/423, 424, 425, 426, 428, 454, 465, 468, 701/483, 484, 516, 517, 522, 532, 537, 412, 701/418; 340/901, 903, 933, 425.5, 435, 340/436, 905, 438, 439, 441, 459, 461, 463; 180/167, 170, 171

See application file for complete search history.

(56) References Cited

U.S. PATENT DOCUMENTS

| 5,760,708 | A | 6/1998 | Seith | |
|---|---|---|---|---|
| 6,081,188 | A | 6/2000 | Kutlicinar et al. | |
| 6,229,438 | B1 | 5/2001 | Kutlicinar et al. | |
| 6,502,035 | B2 * | 12/2002 | Levine | 701/301 |
| 6,721,659 | B2 | 4/2004 | Stopczynski | |
| 6,765,495 | B1 | 7/2004 | Dunning et al. | |
| 6,775,605 | B2 | 8/2004 | Rao et al. | |
| 6,831,572 | B2 | 12/2004 | Strumolo et al. | |
| 6,853,311 | B2 | 2/2005 | Taniguchi | |
| 7,042,344 | B2 | 5/2006 | Chiba et al. | |
| 7,378,986 | B2 * | 5/2008 | Eckstein et al. | 340/902 |
| 7,783,406 | B2 * | 8/2010 | Rothschild | 701/93 |
| 2004/0078133 | A1 | 4/2004 | Miller et al. | |
| 2005/0258977 | A1 | 11/2005 | Kiefer et al. | |
| 2005/0275514 | A1 | 12/2005 | Roberts | |

* cited by examiner

*Primary Examiner* — Thomas Tarcza
*Assistant Examiner* — Edward Pipala

(57) ABSTRACT

A driver assistance or collision avoidance system is adapted for use with trailing and preceding host vehicles, and in a preferred embodiment includes a preceding vehicle speed sensor for determining the current speed of the preceding vehicle at a point; a vehicle-to-vehicle communication subsystem; a normal speed determining sub-system operable to determine the normally expected speed of the preceding vehicle at the point, and including an exterior remote vehicle sensor or digital map-indicia database; and a controller configured to compare the current and normally expected speeds, and the discrepancy there-between to a threshold, and cause an alert to be generated only when the discrepancy exceeds the threshold or an otherwise stalled condition is determined.

20 Claims, 6 Drawing Sheets

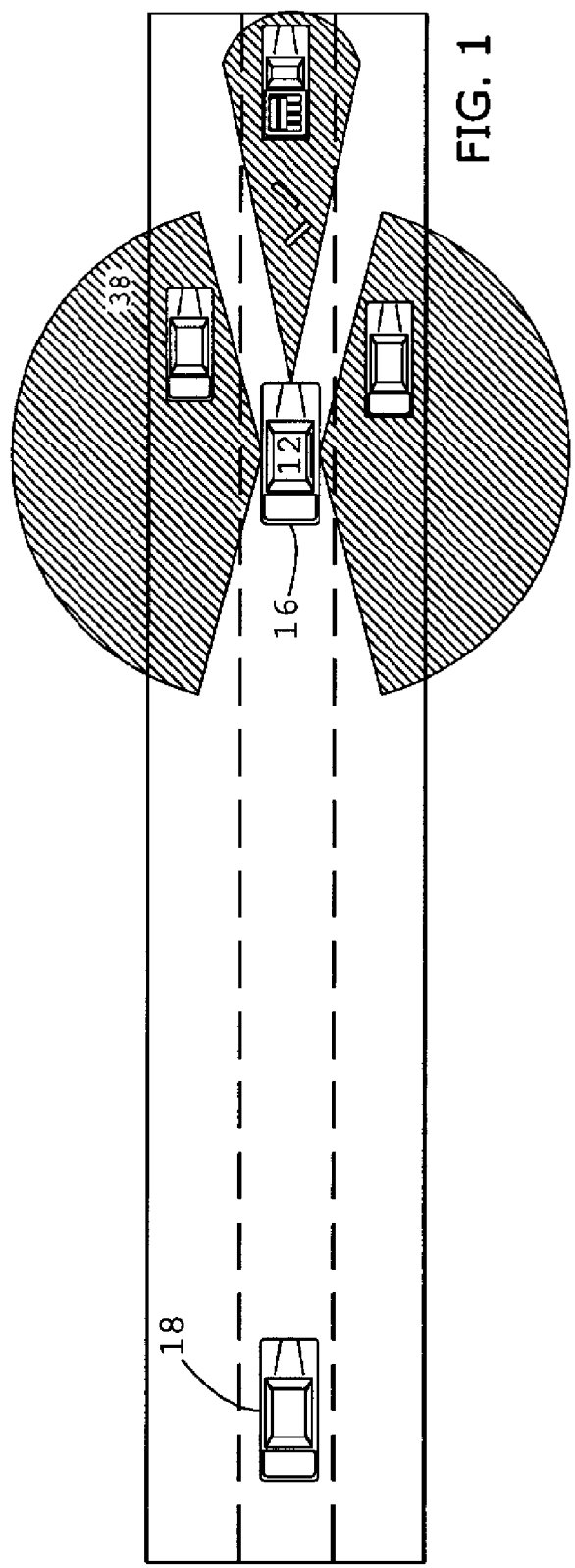
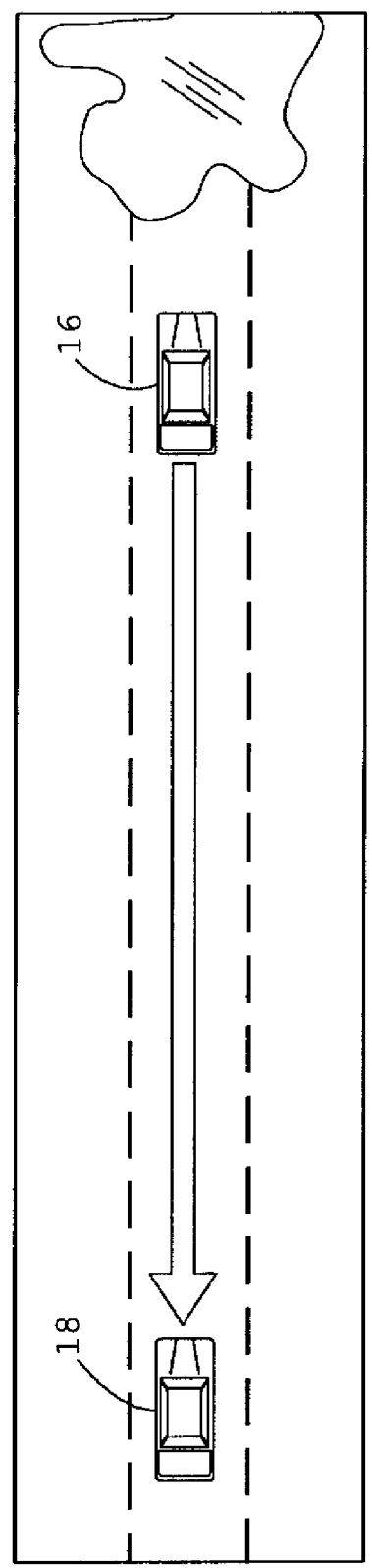

SLOW OR STOPPED VEHICLE AHEAD ADVISOR WITH DIGITAL MAP INTEGRATION

BACKGROUND OF THE INVENTION

1. Technical Field

The present invention relates to driver assistance or collision avoidance systems adapted for use with vehicles, and more particularly to a slow or stopped vehicle alert system configured to determine and selectively alert a trailing vehicle to a preceding vehicle excessive speed discrepancy based on a predetermined normally expected speed, or an otherwise stalled condition.

2. Discussion of Prior Art

Amongst the concerns of drivers on roadways and thoroughfares is the danger posed by slow, stopped, or otherwise stalled preceding vehicles. These vehicles may present an obstacle when the driver least expects it, thereby requiring the driver to drastically manipulate the vehicle. As such, collision avoidance systems have been developed to aid in alerting a driver to an approaching stalled vehicle. A variety of sensory-based implementations that employ exterior sensors to detect objects have been developed with mixed results. Once detected these systems are configured to determine the relative range and speed of an object, and alert an operator typically through visual, audio, or haptic means, if a predetermined threshold is not exceeded. Generally, these systems, however, provide short-range detection according to their sensors capabilities, are limited by line of sight, and as such, are limited in their ability to forewarn a trailing vehicle driver.

More recently, long-range collision avoidance systems have been developed. For example, a headlight implementation utilizes encoded specialized lights, receivers, and decoders to continuously transmit streams of data within light beams.

SUMMARY OF THE INVENTION

A collision avoidance system and method of determining a speed discrepancy or otherwise stalled condition of a vehicle and relaying the condition to a trailing vehicle is described herein. The present invention is useful, among other things, for providing a long-range driver assistance or collision avoidance system that is easily implemented using common intra-vehicle devices and sub-systems. Further, the present invention is useful for providing a method of autonomously determining the presence of the condition by a vehicle and autonomously communicating the same to another vehicle. By analyzing actual versus normally expected speed discrepancies and a long-range communication system, the invention enables the driver of a vehicle to timely identify approaching traffic congestion, and determine a detour.

A first aspect of the present invention concerns a selectively communicating slow vehicle advisory system adapted for use with a trailing vehicle having an operator, and a primary host vehicle traveling upon a thoroughfare and communicatively coupled to and spaced from the trailing vehicle. The system includes at least one vehicle condition-sensor configured to determine the current speed of the host vehicle, and a normal speed determination sub-system configured to determine a normal speed of the host vehicle. A controller is communicatively coupled to the sensor and sub-system, and configured to compare the current and normal speeds, so as to determine a speed discrepancy. The controller is further configured to compare the discrepancy to a speed threshold, and cause to be transmitted to the trailing vehicle a signal, only when the discrepancy exceeds the threshold. Finally, the system includes a slow-vehicle alert generator configured to generate an alert at the trailing vehicle, upon receipt of the signal.

A second aspect of the present invention concerns a selectively alerting slow vehicle advisory system adapted for use with a preceding vehicle, and a primary host vehicle having an operator, traveling upon a thoroughfare, and communicatively coupled to and spaced from the preceding vehicle. The system includes a preceding vehicle speed sensor configured to determine a current speed of the preceding vehicle, and a preceding vehicle locator configured to determine the current position coordinates of the preceding vehicle. A location and speed communication sub-system configured to at least periodically communicate the preceding vehicle speed and location to the host vehicle is also included. A normal speed determination sub-system is configured to determine a normal speed of the preceding vehicle at the location. Finally, the controller functions consistently with the first aspect, resulting in selective alerts only when a speed discrepancy is determined.

The present invention provides a number of enhancements over the prior art, including in the first aspect using digital map databases to identify, and in the second aspect at least one exterior sensor to determine a normal speed of a vehicle at a given time and location. Further, this invention extends vehicle-to-vehicle (V2V) and infrastructure-to-vehicle (I2V) communication utilization in collision avoidance systems. Other aspects and advantages of the present invention will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein:

FIG. 1 is a plan view of a primary host vehicle in a preceding position, nearby traveling remote vehicles, and a trailing receiver vehicle, in accordance with a preferred embodiment of the present invention, particularly illustrating a remote vehicle sensor-based system, and inter-vehicle communication;

FIG. 2 is a plan view of preceding (sender) and trailing (receiver) vehicles, in accordance with a preferred embodiment of the present invention, and inter-vehicle communication;

DETAILED DESCRIPTION OF THE INVENTION

Figure 3:
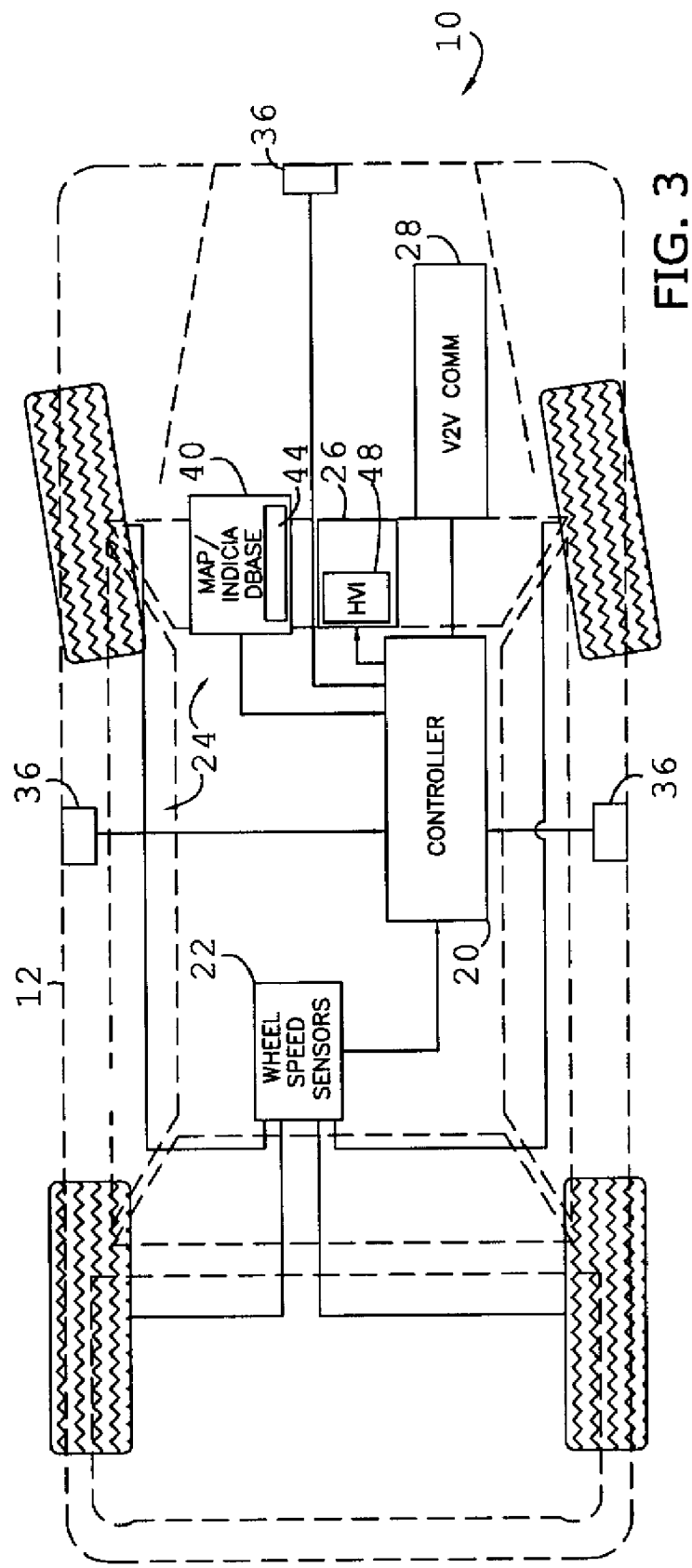
FIG. 3 is a plan view of a fully equipped host vehicle, in accordance with a preferred embodiment of the present invention, wherein the host vehicle could function as either a preceding or trailing vehicle.

The present invention concerns a collision avoidance system 10 adapted for use with host vehicles 12 traveling upon a thoroughfare or road, and by an operator 14. More particularly, and as shown in FIGS. 1 and 2, the system 10 is configured to autonomously identify a slowed, stopped, or otherwise disabled (i.e., stalled) condition of a preceding vehicle 16, and alert the operator 14 of a trailing vehicle 18 and/or the trailing vehicle itself to the condition. The system 10 and methods presented herein are preferably implemented on vehicles that are currently equipped with wireless communication and digital map navigation systems, and as such, are preferably adaptable for use with pre-existing vehicles, as an add-on measure. The system 10 is illustrated and described herein with respect to automotive vehicles, however, it is certainly within the ambit of the invention to utilize the system with other vehicles, such as boats, or where discernment of other stalled preceding, traveling, and communicatively coupled objects is desired.

Preferred embodiments of the invention are described and illustrated herein, where a primary host vehicle 12 presents a preceding vehicle 16, and separately where the primary host vehicle 12 acts as the trailing vehicle 18. As used herein, the "primary" host vehicle 12 shall be the vehicle wherein a majority of system components are located and/or the decision-making algorithm is performed in accordance with the present invention. However, it is appreciated that the preceding and trailing vehicles 16,18 cooperatively host the system 10. More preferably, however, each vehicle 16,18 is fully equipped with complete system components as shown in FIG. 3, so as to function as either a preceding or trailing vehicle 16,18 within a network of inter-communicating nodes.

In general, the primary host vehicle 12, in the preceding (or sender) position is operable to discern an intra-vehicle stalled condition, such as an excessive speed discrepancy, hazard signal or hood, trunk or door ajar indication, and transmit notice of the condition to an arrear or trailing vehicle 18 relative thereto, so as to cause the generation of a warning or alert or the production of an avoidance maneuver at the trailing vehicle. In the trailing (or receiver) position, the primary host vehicle 12 is operable to receive sensory data from and determine a stalled condition of a preceding vehicle 16, and generate an intra-vehicle warning or alert or avoidance maneuver based thereon. The trailing vehicle 18 is preferably configured to re-transmit a received signal to appropriately equipped further trailing vehicles, so as to effect directional propagation of the alert. It is appreciated that retransmission is advantageous in areas of low market penetration or sparse population.

Turning to the configuration of the system 10, the algorithms and function of the present invention are intended to be executed by at least one programmable electronic control unit (ECU) or controller 20 (FIG. 3). A such, the host vehicle 12 includes suitable software and digital storage to effect the intended purposes of the invention. Also shown in FIG. 3, the system 10 includes at least one preceding vehicle speed sensor 22, an inventive preceding vehicle normal speed determination sub-system (NSDS) 24 operable to determine a normally expected or desirable target speed (i.e., "normal speed") for the preceding vehicle at a given location, a slow-vehicle alert generator 26 configured to generate an alert at the trailing vehicle 18, and a wireless V2V communication sub-system 28, so that the trailing and preceding vehicles 16,18 are communicatively coupled. For example, a cellular or satellite (where cellular coverage is not available) communication system may be utilized to wirelessly convey the data. More preferably, a wi-fi (802.11a/b/g) or Dedicated Short Range Communication (DSRC) system may be utilized.

The controller 20 is communicatively coupled to the sensor 22, and NSDS 24, and configured to receive a current and a normally expected vehicle speed therefrom, respectively. The controller 20 compares the speeds by subtracting the current speed from the normally expected speed, so as to determine a speed condition discrepancy, and compares the discrepancy to a predetermined speed threshold (e.g., +32 kph or approximately +20 mph). Finally, where the discrepancy exceeds the threshold, it causes an output signal to be transmitted by the V2V sub-system 28 to the trailing vehicle 18 when in the preceding position, and directly causes an alert to be generated when in the trailing position. More preferably, the sensor 22, NSDS 24, and controller 20 are configured to determine a plurality (e.g., 3) of correlative current and normal speeds, and discrepancies over a period (e.g., 10 seconds), compare each discrepancy to the threshold, and cause the signal to be transmitted only when each discrepancy exceeds the threshold, so as to present a timer, or when receiving distinct speed samples, a counter. It is appreciated that such a timer or counter is necessary to prevent false alerts caused by traffic conditions that may be temporary, or determine whether the sending vehicle is accelerating at a sufficient rate.

Figure 4:
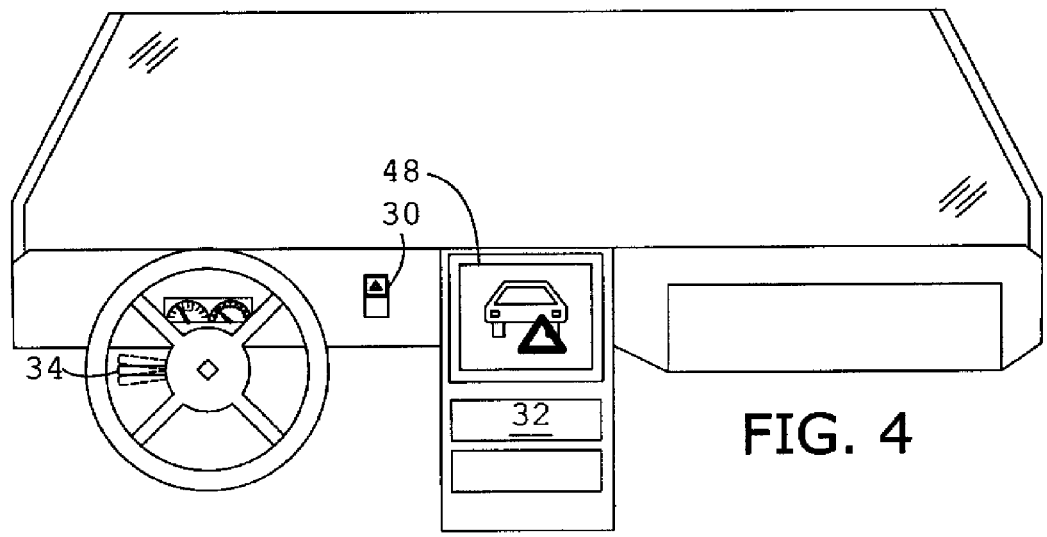
FIG. 4 is an elevation view of an exemplary dashboard and inside compartment of a trailing or preceding host vehicle, particularly illustrating a hazard indication mechanism, a turn signal device, and a monitor displaying an alert.

In addition to threshold exceeding speed discrepancies, the preferred controller 20 is further configured to alert the operator 14 to stalled conditions indicated by a manual or vehicle-generated distress notification. For example, as shown in FIG. 4, where the preceding vehicle 16 includes a hazard notification switch or mechanism 30 that causes a pair of hazard lights to flash intermittently, and is manually shiftable between "on" and "off" positions, the preferred controller 20 is communicatively coupled to the mechanism 30, and further configured to additionally cause the notification signal to be transmitted or alert generated, when the preceding vehicle mechanism 30 is at the "on" position. Where a diagnostic unit 32 (FIG. 4) monitors the various communicating nodes of the preceding vehicle 16, and is configured to autonomously generate a diagnostic trouble code when a drive-train error (i.e., an error that impacts the performance of the drive-train of the vehicle) occurs, the preferred controller 20 is communicatively coupled to the diagnostic unit 32, and further configured to cause the signal to be transmitted or alert generated when a drive-train trouble code is generated.

Conversely, where the preceding vehicle 16 includes a turn signal mechanism 34 (FIG. 4) manually shiftable between "on" and "off" positions, the preferred controller 20 is communicatively coupled to the turn signal mechanism 34, and further configured to prevent the transmission of an otherwise caused signal when the turn signal mechanism 34 is at an "on" position, as it is appreciated that this usually occurs when the preceding vehicle 16 is intentionally causing a speed discrepancy in order to perform a turn maneuver or pull-over. Similarly, where a trailing vehicle turn signal mechanism 34 is in an "on" position, the preferred controller 20 is likewise configured to prevent the generation of the alert, as this is indicative of a change in the immediate path of the trailing vehicle 18.

As previously mentioned, the inventive NSDS 24 is configured to determine the normally expected speed of the preceding vehicle 16 at its current location. A first preferred embodiment of the NSDS 24 is shown in FIGS. 1 and 3, wherein at least one exterior sensor 36 is used to detect and track at least one nearby traveling remote vehicle 38, when the primary host vehicle 12 is in the preceding position. In this configuration, the NSDS 24 detects the relative range and rate of range change of the vehicle 38 relative to the preceding vehicle 16, so that a remote vehicle speed can be determined based on the preceding host vehicle speed. Finally, the NSDS 24 deems the speed of the nearby vehicle 38 to be the normally expected speed of the preceding vehicle 16 and reports it to the controller 20. More preferably, as shown in FIG. 1, a plurality of traveling remote vehicles 36 are detected and considered, and the average of their speeds is determined and reported to the controller 20.

As such, the NSDS 24, in this embodiment, preferably includes short and long range sensors operable to provide overlapping detection and tracking within a zone radius of 50 meters, and more preferably, 100 meters, and may utilize radar, lidar, infrared, vision, or other suitable technologies. It is appreciated that this embodiment of the NSDS 24 is suitable for preceding host vehicle positions only, since sensory detection of remote vehicles near the trailing vehicle 18 would be undesirous.

Figure 5:
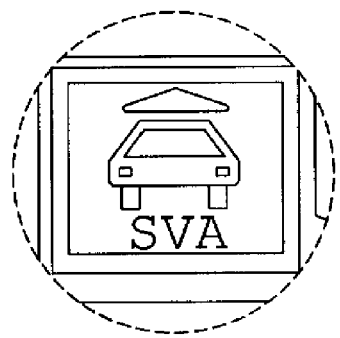
FIG. 5 is an elevation view of a slow-vehicle-alert (SVA) advisory icon indicating a stalled vehicle directly ahead.
Figure 6:
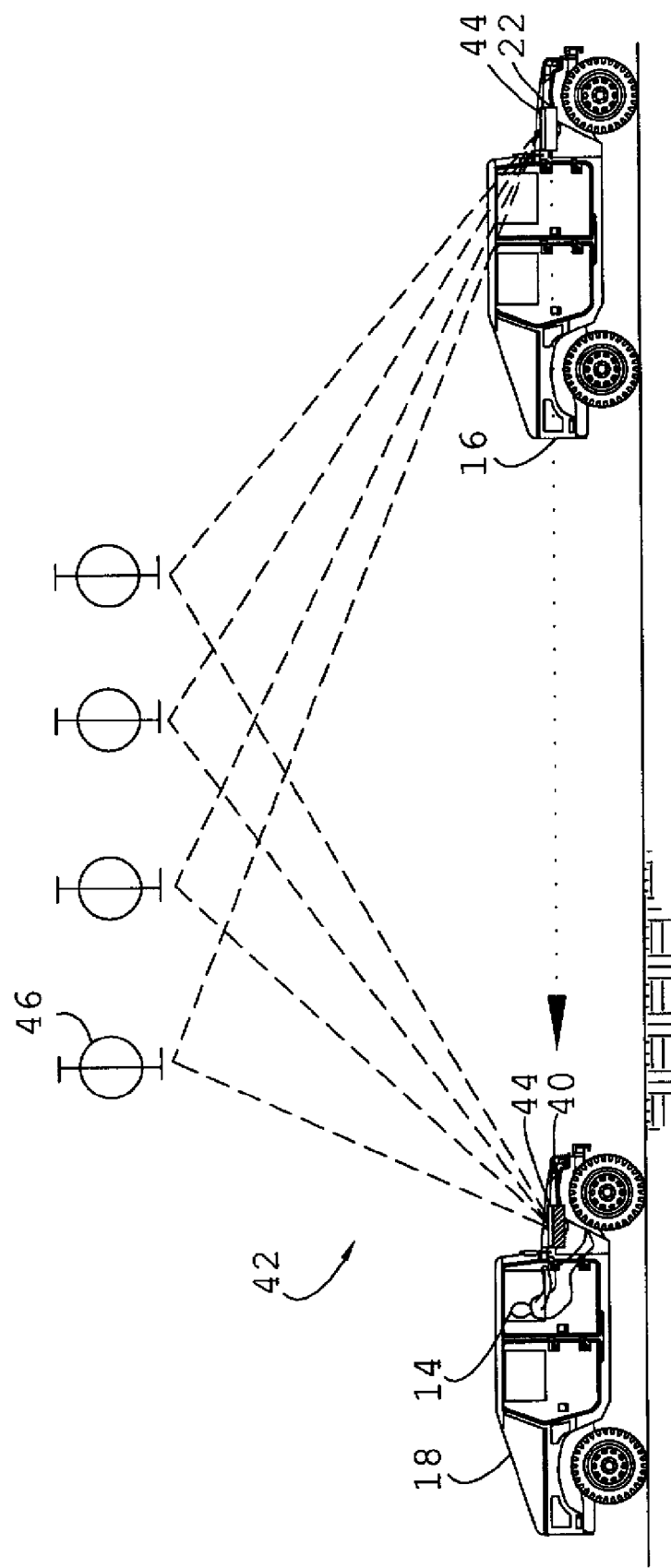
FIG. 6 is an elevation view of the host vehicle, in accordance with a preferred embodiment of the present invention, particularly illustrating a GPS locator.

A second preferred embodiment of the NSDS 24 is shown in FIGS. 2 through 5, and includes in addition to or in lieu of the exterior sensors 36, at least one digital map and indicia database 40, and a locator device 42 (FIG. 6). In this configuration, the NSDS 24 is operable to determine the absolute position of the preceding vehicle 16 in earth inertial coordinates, and match this position with a map position point. The preferred locator device 42 determines the longitude, latitude and height coordinates of the vehicle 12 by utilizing a receiver 44 positioned within the vehicle 12, and communicatively coupled to a plurality of at least four mapped satellites 46 (FIG. 6). Alternatively, other signal sources located at control points could be communicatively coupled to the receiver 44, and other coordinate systems based on a variety of geodetic datum, units, projections, and references could be utilized to pinpoint the vehicle 12.

The preferred database 40 comprises a plurality of Enhanced Digital (ED) maps built from GPS data of actual geographic roadways and thoroughfares, and is preferably periodically updated to ensure accuracy both with respect to road geometry and indicia. The map database 40 includes a plurality of position points representing the currently traveled thoroughfare, and indicia correlated to the points. The indicia includes the normally expected speed (i.e., normal speed) at the given point, wherein the normal speed may be determined, for example, by the mean travel speed as derived from a recent traffic study, or the maximum speed limit at that location. More preferably, the indicia is customized by compiling speed profiles for frequently traveled thoroughfares, and more particularly, by recording the host vehicle speed at given points over a minimum sampling or period and equating the average measured speed at a point to the normally expected speed. Alternatively, so as to reduce the operating size of the map database 40 and increase regeneration rates, each position point preferably includes an ID link that enables correlation of the position point with data from a normal speed database.

More preferably, stopping or slowing locations indicative of traffic lights, and stop and yield sign locations, for example, are also represented in the map database 40, and the controller 20 is further configured to prevent the transmission of the signal, or generation of the alert, when the current position coordinates of the preceding vehicle 16 generally match a stopping or slowing location. It is within the ambit of the invention to also determine a stopping or slowing location through infrastructure-to-vehicle communication, or through inferences drawn from the tracks of preceding vehicles.

It is appreciated that in the trailing position, the primary host vehicle 12 is configured to receive the preceding vehicle current position coordinates, and speed, and the NSDS 24 is configured to utilize the preceding vehicle position coordinates to determine the normally expected speed. As such, the preferred preceding vehicle 16 also includes a GPS locator 42. More preferably, the trailing host vehicle 12 listens to broadcasts from equipped vehicles within a broadcast zone, determine its own current position coordinates, so as to determine the relative location of the vehicle, and compare the speeds only when a preceding-trailing relationship is determined. The broadcasting vehicles at least periodically, and more preferably, continuously broadcast their position coordinates, and speed. More preferably, the preceding vehicle 16 is further configured to determine and broadcast its heading, and most preferably, notification of additional conditions, such as hazard mechanism, and/or turn signal actuation, and diagnostic error code generation are also broadcasted.

More preferably, the NSDS 24, and controller 20 are cooperatively configured to further determine a same-thoroughfare travel condition based on the current position coordinates of the preceding and host vehicles 16,18, and database 40, and compare the speeds only when the same-thoroughfare travel condition is determined. Most preferably, where the NSDS 24 includes a navigation system configured to receive a destination input, and generate a navigation route or predicted path, the NSDS 24, and controller 20 are cooperatively configured to further determine a same-path travel condition based on the current position coordinates of the preceding and host vehicles, and the current path predicted by the navigation system, and compare the speeds only when the same-path condition is determined. Alternatively, where a map database is not available or a path to sender cannot be determined based on vehicle wireless trails, the controller 20 may be configured to compare the height coordinates of the preceding and trailing vehicles 16,18, and prevent generation of the alert where an excessive height difference is determined.

Figure 5B:
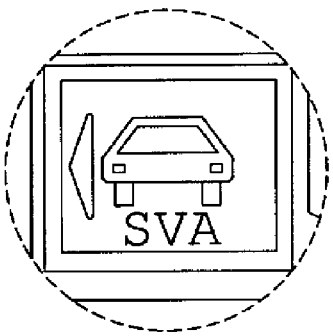
FIG. 5b is an elevation view of an SVA advisory icon indicating a stalled vehicle ahead and to the left.
Figure 5A:
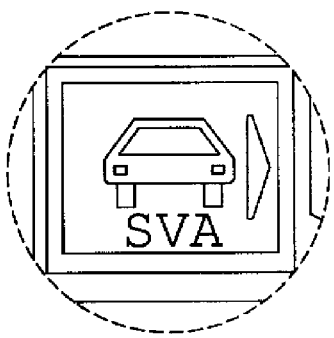
FIG. 5a is an elevation view of an SVA advisory icon indicating a stalled vehicle ahead and to the right.

The alert generator 26 is located within the trailing vehicle 18, and configured to generate the alert through audio, visual, or haptic means, so as to notify the operator 14 of the stalled vehicle ahead (SVA). For example, as shown in FIG. 4, the system 10 may include a human-vehicle interface monitor 48, and the alert may present visual depictions of a stalled vehicle, hazard symbol, or warning indicia, and an associated audible sound or haptic feedback. The preferred alert generator 26 is configured to generate a plurality of differing alerts, wherein each alert correlates to a different stalled condition, such as the relative direction and/or distance from the trailing vehicle 18 to the preceding SVA vehicle 16, or type of condition. More particularly, as shown in FIGS. 5 through 5b, if the preceding vehicle 16 is directly ahead an icon including a forward projecting arrow may be displayed (FIG. 5), where the preceding SVA 16 is within a left lane relative to the trailing vehicle lane location, the icon may include a leftward projecting arrow (FIG. 5a), and similarly a right arrow may be used to indicate a rightward SVA (FIG. 5b).

Alternatively, where the trailing vehicle 18 presents autonomous operation, the alert generator 26 is configured to effect an autonomous detour or avoidance maneuver by the trailing vehicle 18. For example, where the trailing vehicle 18 includes a lane-change module that is configured to automatically effect a lane change by the vehicle 18, it is desirous for the SVA to be configured to trigger such a lane change response, so as to steer the trailing vehicle 18 around the preceding slow vehicle or obstacle 16. Further, where the trailing vehicle 18 includes a brake module configured to activate the braking system of the vehicle 18, it is desirous for the SVA to be configured to cause brake actuation by the module, so as to cautiously pass the preceding hazard. This, it is appreciated, provides an SVA based speed control that could be active either in adaptive cruise control or standalone. Moreover, speed limit information from the map database 40 could be used to set the desired reduction in speed.

More preferably, the system 10 also includes an adjustment mechanism configured to receive an input from the operator 14, or primary host vehicle 12, and modify the threshold or the generation of the alert according to the operator or vehicular input. For example, where the operator 14 prefers maximum notice, the controller 20 may receive input so that the threshold is reduced from +32 kph to a lower value, such as +25 kph. Alternatively, the system 10 may be configured to autonomously reduce the threshold, timer, or counter, when the trailing vehicle 18 is located on a residential road (or based on other road class information) according to the map database and current position of either the preceding or trailing vehicle 16,18. Where a trailing host vehicle further includes a braking module (not shown) shiftable between engaged and disengaged positions, the controller 20 is further configured to supress generation of the alert when the module is at the engaged position, as this would indicate that the operator 14 had already perceived the preceding vehicle speed discrepancy or otherwise stalled condition. Finally, where a higher priority alert, such as a hard braking event, or collision warning indication, is currently being generated, the preferred controller 20 is further configured to suppress SVA generation.

Figure 7:
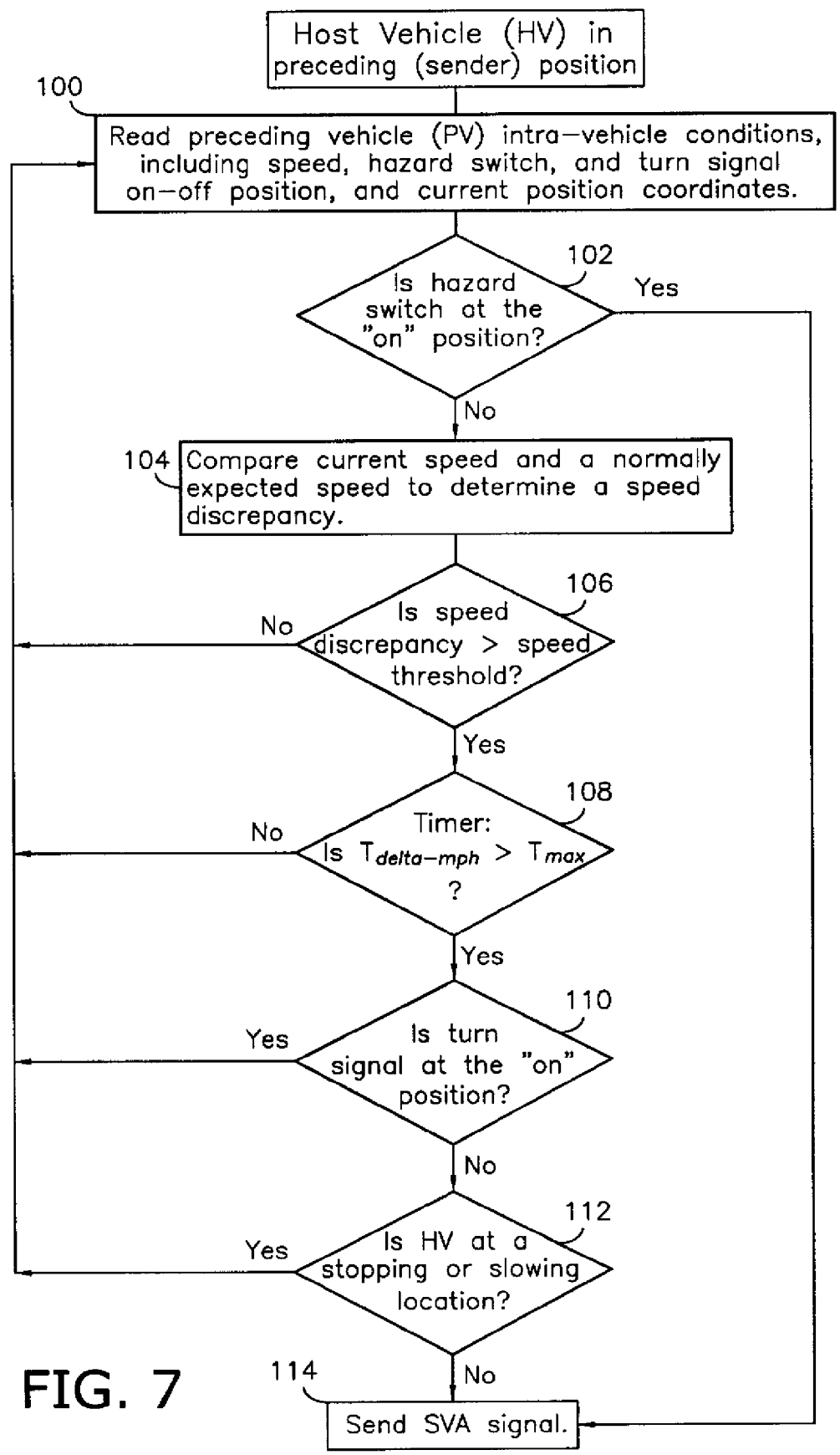
FIG. 7 is a flowchart of a preferred method of selectively alerting a trailing vehicle of a preceding stalled host vehicle condition, in accordance with a preferred embodiment of the present invention, wherein the primary host vehicle is the preceding vehicle.
Figure 8:
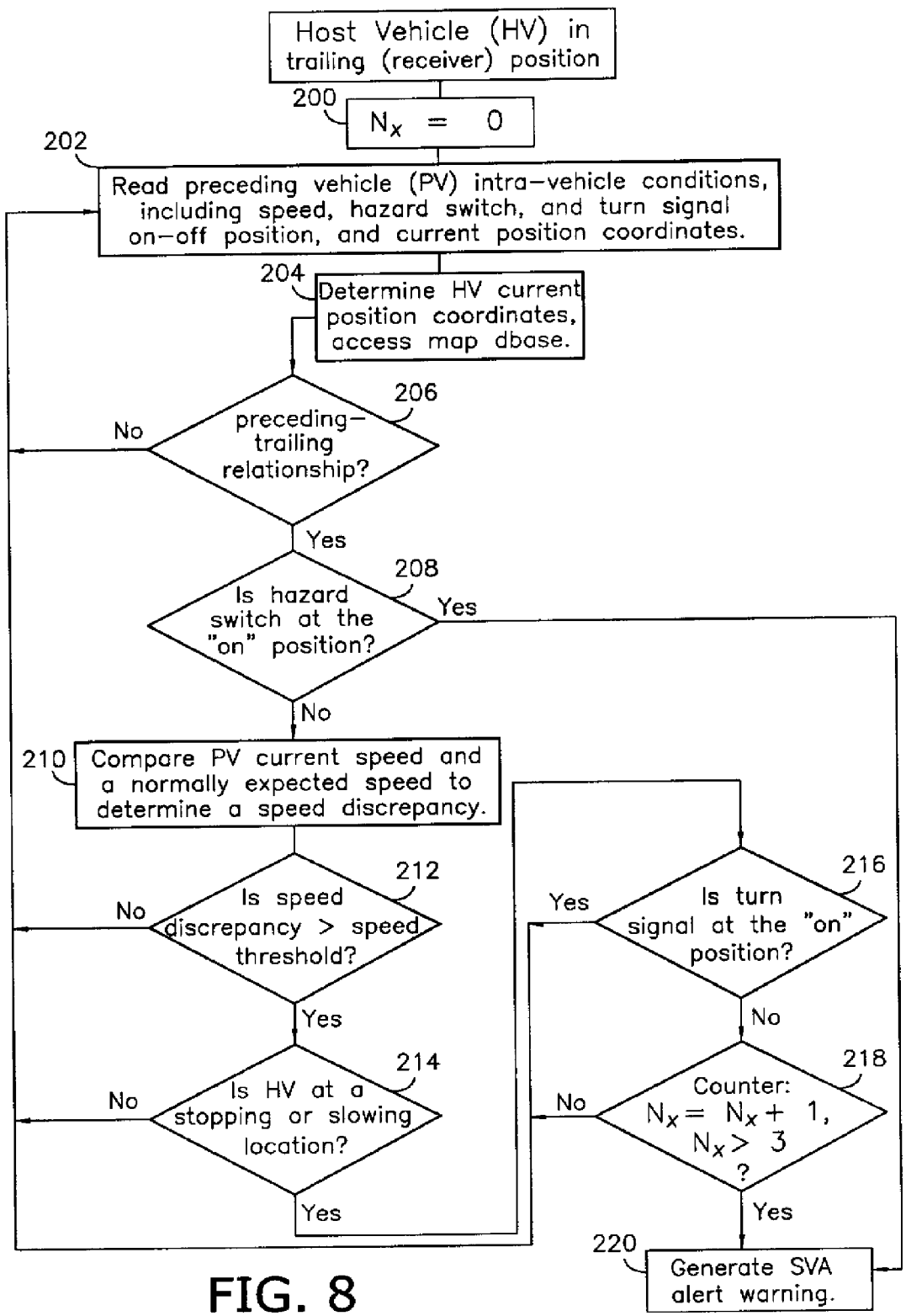
FIG. 8 is a flowchart of a preferred method of selectively alerting a trailing vehicle of a stalled condition of a preceding vehicle, in accordance with a preferred embodiment of the present invention, wherein the primary host vehicle is the trailing vehicle.

Thus, as shown in FIG. 7, a first preferred method of alerting a trailing vehicle of a preceding vehicle stalled condition in accordance with the present invention, wherein the primary host vehicle 12 is in the preceding (or sender) position, begins at a step 100 where various intra-vehicle conditions, including the current speed and position coordinates are read. At a step 102, the hazard mechanism position is analyzed. If the hazard mechanism is at the "on" position, then the method precedes to step 114, where the preceding host vehicle sends an SVA alert signal. If the hazard is not on, then the method precedes to a step 104, where the current speed is compared to the normally expected speed as determined through sensory detection of nearby remote vehicles, or a digital map/indicia database, to determine a speed discrepancy. If a discrepancy greater than a predetermined threshold is present at a step 106, then a timer is analyzed to determine whether the duration of the discrepancy, $T_{delta-mph}$, exceeds a duration threshold, $T_{max}$, at a step 108. If a sufficient duration is determined, the preceding vehicle turn signal actuation is then analyzed at step 110; otherwise, the method returns to step 100. If the turn signal is not on, the preceding vehicle position coordinates, at a step 112, are compared to the map to determine whether the preceding vehicle is at a slowing or stopping location; otherwise the method returns to step 100. Finally, at a step 114, if the vehicle is not located at a slowing or stopping location, an SVA signal is broadcasted or otherwise caused to be communicated through V2V communication; otherwise, the method returns to step 100.

A second preferred method begins at a step 200, where the primary host vehicle 12 is in a trailing (or receiver) position, and a counter variable, $N_x$, is set to "0" at the trailing vehicle. At a step 202, various intra-vehicle conditions, including the current speed, current position coordinates, hazard mechanism status, and turn signal status, are read, and broadcasted or otherwise transmitted by a remotely traveling vehicle. At a step 204, the host vehicle 12 determines its current position coordinates. At a step 206, the current position coordinates of the remote and trailing host vehicles are analyzed with respect to a map database to determine whether they are traveling upon the same thoroughfare in a preceding-tailing relationship. More preferably, at step 206, the positions are also analyzed with respect to a predetermined navigation route or path to determine whether both vehicles are on the same path. If a same-thoroughfare, and more preferably, same-path condition is present, then at a step 208, the preceding vehicle hazard mechanism position is analyzed; otherwise the method returns to step 202.

If the hazard mechanism is at the "on" position, then the method precedes to step 220, where the trailing host vehicle generates an SVA alert. If the preceding vehicle hazard is not on, then the method precedes to a step 210, where a normally expected speed for the preceding vehicle at its current location is determined from a database and compared to the preceding vehicle current speed, so as to determine a speed discrepancy. At a step 212, the discrepancy is compared to a predetermined threshold. If the discrepancy it greater than the threshold, then the preceding vehicle turn signal actuation is analyzed at step 214; otherwise, the method returns to step 202. If the turn signal is not on, then at a step 216 the preceding vehicle position coordinates are further compared to the map to determine whether the preceding vehicle is at a predefined slowing or stopping location. If the turn signal is on, then the method again returns to step 202. If the preceding vehicle is not located at a slowing or stopping location, the counter is analyzed at step 218 to determine whether the number of non-compliant discrepancies exceeds a sampling threshold. More particularly, at step 218, $N_x=N_x+1$, and if $N_x>3$ (for example), an SVA alert is generated at a step 220; otherwise the method returns to step 202 where another speed sample is considered.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system not materially departing from but outside the literal scope of the invention as set forth in the following claims.

What is claimed is:

1. A selectively communicating slow or stopped vehicle advisory system employable by a trailing vehicle having an operator and a primary host vehicle traveling upon a thoroughfare, wherein the host vehicle is communicatively coupled to and spaced from the trailing vehicle, so as to define a wireless vehicle-to-vehicle (V-2-V) system, said system comprising:

at least one vehicle condition sensor configured to determine the current speed of the host vehicle;

a normal speed determination sub-system configured to determine a normal speed of the host vehicle;

a controller communicatively coupled to the sensor and sub-system and configured to compare the current and normal speeds, so as to determine a speed discrepancy, compare the discrepancy to a speed threshold, and selectively cause to be transmitted to the trailing vehicle a signal using the V-2-V system, only when the discrepancy exceeds the threshold; and
a slow-vehicle alert generator configured to generate an alert at the trailing vehicle upon receipt of the signal.

2. The system as claimed in claim 1,
said sensor and sub-system being further configured to determine a plurality of sets of current and correlative normal speeds over a period,
said controller being further configured to compare each set of current and correlative normal speeds, so as to determine a plurality of discrepancies, compare each discrepancy to the threshold, and cause the signal to be transmitted only when each discrepancy exceeds the threshold over the period.

3. The system as claimed in claim 1,
said host vehicle including a hazard notification mechanism manually shiftable between "on" and "off" positions by the operator,
said controller being further configured to cause the signal to be transmitted when the discrepancy exceeds the threshold or the mechanism is at the "on" position.

4. The system as claimed in claim 1,
said host vehicle including diagnostic software configured to autonomously generate a diagnostic trouble code, when a drive-train error occurs,
said controller being further configured to cause the signal to be transmitted when the discrepancy exceeds the threshold or the trouble code is generated.

5. The system as claimed in claim 1,
said host vehicle including a turn signal mechanism manually shiftable between "on" and "off" positions by the operator,
said controller being further configured to not cause the signal to be transmitted, when the turn signal mechanism is at the "on" position.

6. The system as claimed in claim 1,
said controller being further configured to generate a plurality of differing alerts, wherein each alert correlates to a relative direction from the trailing vehicle to the host vehicle.

7. The system as claimed in claim 1; and
an adjustment mechanism configured to receive an input from the operator, host vehicle or trailing vehicle, and modify the threshold or the generation of the alert according to the operator or vehicular input.

8. The system as claimed in claim 7, wherein said sub-system includes a locator device and a map database, and the input is a road classification retrieved from the map database.

9. The system as claimed in claim 1; and
a host vehicle communication sub-system configured to directionally re-transmit the alert from the host vehicle,
said controller being further configured to store the alert, and cause the alert to be re-transmitted to further trailing vehicles.

10. The system as claimed in claim 1,
said sub-system including a locator device, and a map database,
said locator being configured to determine the current position coordinates of the host vehicle,
said map including a plurality of position points representing the thoroughfare, and indicia correlated to said points, wherein the indicia includes the normal speed at the given point,
said locator, and database being configured to match the current position coordinates with a position coordinate and retrieve the normal speed at the point.

11. The system as claimed in claim 10,
said controller being further configured to determine a current heading for the host vehicle,
said signal including the current position coordinates and the heading of the host vehicle,
said alert being further configured to notify the operator of a relative left, right, or straight-ahead host vehicle position.

12. The system as claimed in claim 10, wherein a portion of said database points represent stopping or slowing locations, and said controller is further configured to not cause the signal to be transmitted, when the host vehicle current position coordinates generally match a stopping location, and the discrepancy exceeds the threshold.

13. A selectively communicating slow or stopped vehicle advisory system employable by a trailing vehicle having an operator and a primary host vehicle traveling upon a thoroughfare, wherein the host vehicle is communicatively coupled to and spaced from the trailing vehicle, said system comprising:
at least one vehicle condition-sensor configured to determine the current speed of the host vehicle;
a normal speed determination sub-system configured to determine a normal speed of the host vehicle,
said sub-system including a locator device, and a map database,
said locator being configured to determine the current position coordinates of the host vehicle,
said map including a plurality of position points representing the thoroughfare, and indicia correlated to said points, wherein the indicia includes the normal speed at the location,
said locator, and database being further configured to match the current position coordinates with a position coordinate and retrieve the normal speed at the location;
a controller communicatively coupled to the sensor and sub-system, and configured to compare the current and normal speeds, so as to determine a speed discrepancy, compare the discrepancy to a speed threshold not less than positive 10 miles per hour, as measured by subtracting the preceding vehicle current speed from its normal speed at the location, and selectively cause to be transmitted to the trailing vehicle a signal only when the discrepancy exceeds the threshold; and
a remote vehicle alert generator configured to generate a plurality of differing alerts at the trailing vehicle, wherein each alert correlates to a relative direction from the trailing vehicle to the host vehicle
said host vehicle including a turn signal mechanism manually shiftable between "on" and "off" positions by the operator,
said controller being further configured to not cause the signal to be transmitted, when the turn signal mechanism is at the "on" position.

14. A selectively alerting slow or stopped vehicle advisory system employable by a preceding vehicle and a primary host vehicle, wherein the host vehicle has an operator, travels upon a thoroughfare, and is communicatively coupled to and spaced from the preceding vehicle, said system comprising:
a preceding vehicle speed sensor configured to determine the current speed of preceding vehicle;
a preceding vehicle locator configured to determine the current position coordinates of the preceding vehicle;
a location and speed vehicle-to-vehicle (V-2-V) communication sub-system configured to at least periodically communicate the preceding vehicle speed and location to the host vehicle wirelessly;

a normal speed determination sub-system configured to determine a normal speed of the preceding vehicle at the location; and a controller configured to compare the current and normal speeds, so as to determine a speed discrepancy, compare the discrepancy to a speed threshold, and selectively cause to be generated an alert only when the discrepancy exceeds the threshold.

15. The system as claimed in claim 14; and a host vehicle locator communicatively coupled to the controller, and configured to determine current host vehicle position coordinates, and a current host vehicle heading, said preceding vehicle locator and sub-system being further configured to determine and transmit a current heading of the preceding vehicle, said controller being further configured to determine a host vehicle trailing condition based on the preceding and host vehicle position coordinates, and headings, and compare the speeds, only when the host vehicle trailing condition is determined.

16. The system as claimed in claim 15, said host vehicle locator including a map database, wherein said database includes a plurality of position points representing the thoroughfare, said controller being further configured to determine a same-thoroughfare travel condition, based on the current position coordinates of the preceding and host vehicles, and database, and to compare the speeds only when the same-thoroughfare travel condition is determined.

17. The system as claimed in claim 16, said host vehicle locator being further configured to receive a destination input, and generate a navigation route, based on the current position coordinates and the destination input, said controller being further configured to determine, based on the current position coordinates of the preceding and host vehicles, and the route, a same-route travel condition, wherein the current position coordinates of the preceding vehicle are located on the route, and to compare the speeds only when the same-route travel condition is determined.

18. The system as claimed in claim 14, said preceding vehicle speed sensor being further configured to determine a plurality of current speeds over a period;

said communication sub-system being further configured to communicate the plurality of preceding vehicle current speeds to the host vehicle;

said controller being further configured to determine a preceding vehicle acceleration rate based on the plurality of current speeds and period, compare the acceleration rate to an acceleration threshold, and cause the alert to be generated, only when the rate does not exceed the threshold.

19. The system as claimed in claim 14, said host vehicle including a lane-change module configured to autonomously effect a lane change by the host vehicle, said controller being communicatively coupled to the lane-change module, said alert being configured to cause an autonomous lane change by the host vehicle.

20. The system as claimed in claim 14, said host vehicle including a brake system configured to reduce the host vehicle speed, and a brake module configured to autonomously activate the brake system, said controller being communicatively coupled to the brake module, said alert being configured to autonomously activate the brake system.

* * * * *